June 26, 1945.  F. R. MAYS ET AL  2,379,095
TIRE
Filed Oct. 14, 1942  4 Sheets-Sheet 1

Fig. 1

Inventors
Floyd R. Mays
Robert R. Royal
By Henry Fuchs Atty.

June 26, 1945.  F. R. MAYS ET AL  2,379,095
TIRE
Filed Oct. 14, 1942  4 Sheets-Sheet 4

Inventors
Floyd R. Mays
Robert R. Royal
By Henry Fuchs
Atty.

Patented June 26, 1945

2,379,095

UNITED STATES PATENT OFFICE 2,379,095

TIRE

Floyd R. Mays, Chicago, Ill., and Robert R. Royal, Paducah, Ky.

Application October 14, 1942, Serial No. 461,922

13 Claims. (Cl. 152—39)

This invention relates to tires for automotive vehicles, and more particularly resilient tires for the wheels of trucks as well as other types of automobiles.

One object of the invention is to provide a resilient tire composed of material other than rubber, adapted to be mounted on the wheel of an automotive vehicle, wherein spring means is employed to effectively absorb the shocks to which the vehicle is subjected in service.

A further object of the invention is to provide a tire of the character indicated comprising inner and outer rims which are relatively movable toward and away from each other radially of the wheel and also are adapted to have slight relative rotation, and spring means cooperating with said rims to yieldingly oppose said relative radial movement and rotation, thereby absorbing the shocks while the vehicle is traveling over a roadway, as well as the shocks due to driving torque.

A more specific object of the invention is to provide a tire structure for vehicle wheels of the character indicated in the preceding paragraph wherein the outer rim is composed of a circular series of hard wood segments or blocks, and the inner rim is composed of a circular series of hard wood segments or blocks, opposed to the first named series, and wherein the spring means comprises a plurality of coil springs interposed between the blocks of the outer and inner rims to yieldingly oppose radial relative movement of said rims, and a plurality of leaf springs disposed radially of the rims and extending between adjacent of the blocks of the inner and outer rims to yieldingly resist relative rotation of said rims, to radially carry the load, and absorb the shocks of driving torque.

Still another object of the invention is to provide in a tire as set forth in the preceding paragraph means for snubbing the action of the coil springs comprising friction housings within which the plate springs have sliding frictional engagement.

Other objects of the invention will more clearly appear from the description and claims hereinafter following.

In the drawings forming a part of this specification.

Referring first to the embodiment of the invention illustrated in Figures 1 to 4 inclusive, 10 indicates a motor truck wheel of well-known design, comprising the usual hub portion 11 and spokes 12 radiating therefrom. The spokes 12 are six in number and have beveled supporting faces 13 at their outer ends adapted to accommodate the inner side portion of the usual demountable tire. A clamping lug 14 is arranged at the outer end portion of each spoke and is held against the outer side of the spoke and secured thereto by the usual bolt 15 extending through the lug and spoke. The clamping lug is of the usual type designed to engage the bead of the ordinary wheel rim employed on motor vehicles and clamps the rim against the faces 13—13 of the spokes. The wheel 10 carries the usual brake drum 16 on the inner side thereof. As is common practice, the wheel 10 is provided with webs 17—17 between adjacent spokes at the hub portion of the wheel, to which webs the drum 16 is secured by bolts.

Our improved tire, as disclosed in Figures 1, 2, 3, and 4, comprises broadly an inner ring A of channel-shaped transverse cross section; an annular series of hard wood segments or blocks B—B seated in the channel of the ring A and fixed to said ring; a second annular series of hard wood segments or blocks C—C surrounding the series B—B and spaced therefrom; an outer bandlike ring D around the series of blocks C—C and to which the latter are fixed; shock absorbing coil springs E—E interposed between the inner and outer annular series of blocks; radially disposed sets of leaf springs F—F having their opposite ends engaged respectively between adjacent inner blocks and adjacent outer blocks; friction housings G—G between adjacent of the inner blocks and slidingly receiving the inner ends of the sets of leaf springs F—F; and flat ringlike side plates H—H at opposite sides of the outer series of blocks, secured to the latter and telescoped over the sides of the channel ring A.

Figure 1:
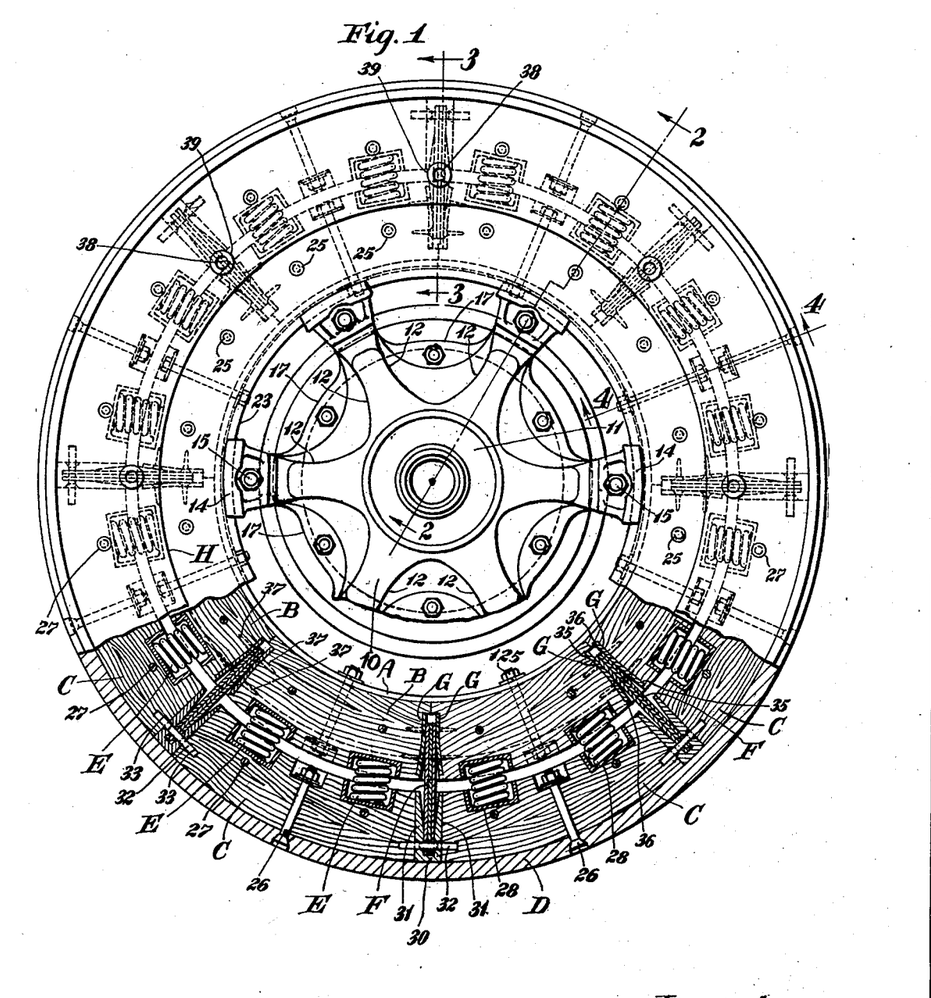
Figure 1 is a part side elevational and part vertical sectional view of a wheel of an automobile or motor truck illustrating our improvements in connection therewith.
Figure 2:
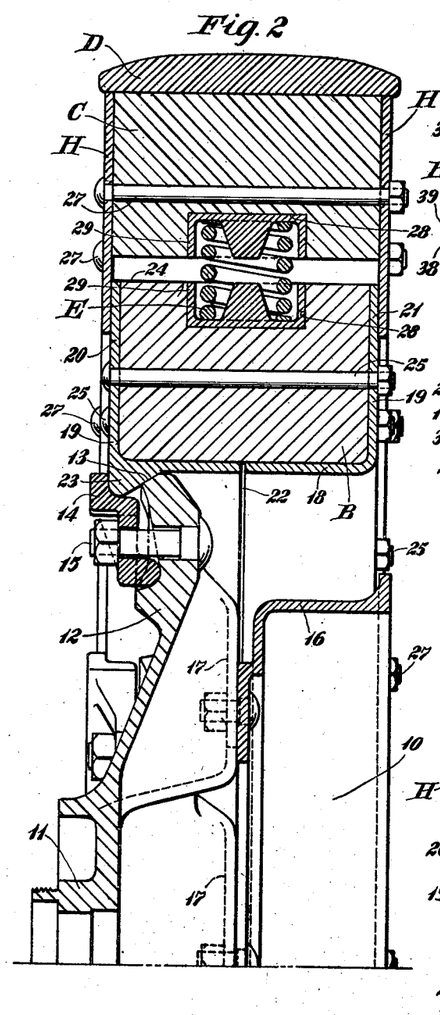
Figure 2 is a transverse, radial, sectional view, corresponding substantially to the line 2—2 of Figure 1.
Figure 3:
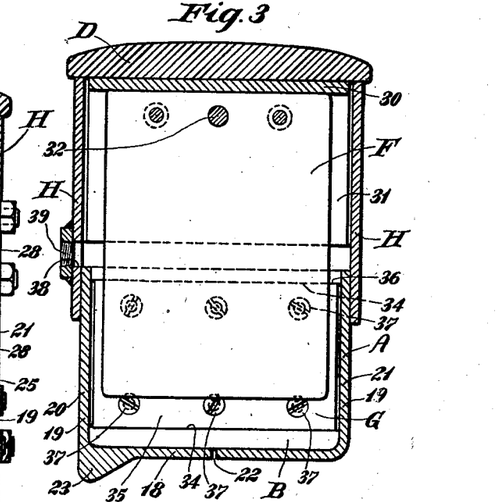
Figures 3 and 4 are transverse, radial, sectional views of the tire member, corresponding respectively to the lines 3—3 and 4—4 of Figure 1.
Figure 4:
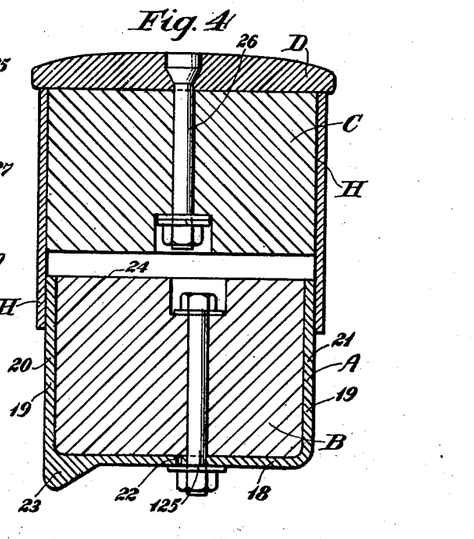

The inner ring A, which is preferably of steel, comprises a substantially flat bandlike annulus 18 having outstanding circular flanges 19—19 at opposite sides thereof, the flanges being at substantially right angles to the annulus 18 and defining therewith a channel. In other words, the ring or annulus A is of substantially U-shaped transverse cross section, as seen in Figures 2, 3, and 4. The annulus A is preferably of two piece construction in order to facilitate assembly thereof with the blocks B—B and tight clamping of said blocks between the flanges 19—19. The two sections of the annulus A are indicated respectively by 20 and 21, the annulus being divided centrally as indicated at 22, thereby providing, in effect, two rings of L-shaped transverse cross section. The section 20 is disposed at the outer side of the wheel and is provided with an exterior bead 23 on its inner side near the outer edge thereof, directed inwardly toward the hub of the wheel. The bead 23 corresponds to the bead on the ordinary wheel rim by which the same is clamped to the wheel. As shown in Figure 1, the bead 23 is engaged by the clamping lugs 14 to clamp the bead against the faces 13—13 of the spokes of the wheel.

The blocks or segments B, which are of hard wood, are preferably eight in number, as illustrated in the drawings. Each block B has the inner side face thereof curved to fit the curved inner surface of the bottom wall of the ring A. The blocks B are all of the same size and are arranged in annular series within the channel of the ring A. These blocks engage end to end and are of such a thickness that they fill the channel with their outer faces 24—24 flush with the peripheral edges of the flanges 19—19 of said ring A. Each block is secured between the two sections 20 and 21 of the ring A by a pair of spaced, transverse bolts 25—25 extending through the block and the flanges 19—19 of the ring or annulus A. In addition, each block B is further anchored to the section 21 of the annulus A by a radially disposed bolt 125 extending through the block B and the wall portion of the annulus 18 formed on the section 21. As shown, the block B is countersunk to accommodate the head of the bolt 125 so that the outer surface of the block is free of any projections. The outer faces 24—24 of these blocks B form, in effect, a continuous annular surface curved on an arc of the same radius as the peripheral edges of the flanges 19—19 of the ring 18.

The blocks or segments C—C, which are also preferably of hard wood, correspond in number to the blocks B—B and are directly opposed thereto. The blocks C—C are a little wider than the blocks B—B. As clearly shown in Figure 2, each block C is of a width as great as the corresponding block B plus the thickness of the flanges 19—19 of the ring A which embrace the block B. These blocks C—C are arranged in annular series surrounding the blocks B—B and are secured to the interior surface of the ringlike band D, the surfaces of the blocks C, which bear on the ring D, being of a curvature to closely fit the ring.

The ring D is preferably of steel and is in the form of a heavy flat band. The outer surface of the ring D is slightly crowned transversely, as clearly illustrated in Figure 2. This ring forms the tread of the tire and is of considerably greater transverse width than the blocks C overhanging the same on both sides. The blocks C—C are secured to the ring D by radial bolts 26—26 extending through blocks and the bandlike ring D, the ring D being countersunk to accommodate the heads of the bolts.

The side plates H—H, which are preferably of steel, are disposed at opposite sides of the blocks C—C. Each side plate H is in the form of a ring and has its outer edge bearing on and fitting the inner curved surface of the ring D. These ringlike side plates are secured to the blocks C—C which they embrace by bolts 27—27 extending through said plates and blocks, two bolts being provided for each block. As shown in Figures 2, 3, and 4, the plates H—H exteriorly overlap the flanges 19—19 of the ring A, thus telescoping over the latter.

The blocks B and C are provided with opposed and aligned spring pockets or seats 28—28, each pocket 28 being lined with a cup-shaped cap 29, which is preferably made of steel and hardened to resist wear. As shown most clearly in Figure 1, each of the blocks B and C has two such spring seats 28—28.

The coil springs E—E, of which there are sixteen, are interposed between the outer and inner rims of the tire, that is, they are interposed between the blocks of the inner and outer series. The opposite ends of the springs E—E are seated in the cups 29—29 of the pockets 28—28 of the blocks B and C, respectively, thereby yieldingly opposing relative approach of the inner and outer rim members of the tire. The springs E—E are preferably under initial compression and are of such a capacity that they will absorb the maximum shocks to which the tire is subjected in service without going solid and will prevent contact of the outer rim with the inner rim at maximum displacement of the rims with respect to each other in radial direction. As shown most clearly in Figure 1, the blocks C—C are spaced from each other circumferentially and metal housings 30—30 are interposed between adjacent blocks. The housings 30—30 are preferably formed of steel and are of U-shaped cross section having side walls 31—31 connected by an end wall. As shown, the housings are open at their inner ends. They are eight in number, being alternated with the blocks C—C. The housings 30—30 are interiorly tapered, the inner side walls 31—31 thereof diverging outwardly toward the open end of the same. The open ends of the housings 30—30 are flush with the inner faces of the blocks C—C.

The leaf springs F—F, which are in the form of flat, rectangular plates, are arranged in sets of three spring plates each. Eight of these sets of spring plates are employed in the complete tire, one for each housing 30, each set having its outer ends extending into the corresponding housing 30. As shown in Figure 1, each set of plates is fixed in the housing 30 by a pin 32 extending through the plates and the side walls of the housing. The pin 32 also serves to anchor the housing 30 to the adjacent blocks C—C, the opposite ends of the pin which project beyond the housing being fixed in suitable openings 33—33 provided in these blocks.

The friction housings G—G are eight in number and disposed between adjacent blocks B—B of the inner rim of the tire, the ends of opposed blocks being cut out, as indicated at 34—34, to provide pockets to accommodate the housings. Each housing G is defined by a pair of opposed side walls comprising steel plates 35—35. The outer end portions 36—36 diverge outwardly and the sides of the pockets which accommodate the same are correspondingly formed. The housings G are thus flared outwardly at their outer ends and have the side wall portions rearwardly thereof parallel. The plates 35—35 may be secured to the blocks by any suitable means, such as screws 37—37, extending through the plates and into the blocks. As shown in Figure 1, each housing G is opposed to the corresponding housing 30 and slidingly receives the inner ends of the set of leaf or plate springs F. These spring plates normally extend into the rear portion of the housing G, which rear portion has the walls parallel. Inasmuch as the extreme opposite ends of the leaf springs F—F are confined against lateral movement in the respective housings, these leaf springs yieldingly resist relative rotation of the outer and inner rims of the tire, thus absorbing the shocks sustained due to driving torque, the flaring arrangement of the housings permitting the necessary flexing of the plates. Relative approach of the outer and inner rims to absorb shocks as the vehicle passes over a rough road are also absorbed by flexing of these leaf springs, and this is one of the main functions of these springs.

In addition to providing resistance to torque and road shock, the leaf springs F—F in combination with the housings G—G form means for snubbing the action of the coil springs E—E, the outer spring plates of each set of leaf springs having frictional sliding engagement with the walls of these housings as the leaf springs are projected inwardly of the housings G and withdrawn therefrom during relative movement of the outer and inner rims of the tire toward and away from each other.

The leaf springs F—F are properly lubricated, the outer cover plate H of the outer rim of the tire being provided with suitable openings 38—38 through which the lubricant may be injected. The openings 38—38 are in alignment with the respective sets of leaf springs F—F at a point substantially midway between the ends of the spring plates. Suitable fittings 39—39 are secured to the outer cover plate H at said openings 38—38 to which the discharge tube or nozzle of a greasing device is connected when it is found necessary to lubricate the leaf springs.

In the operation of our improved tire, shocks due to roughness of the road on which the vehicle is traveling are effectively absorbed by the springs E and F, the same cushioning the bouncing movement of the outer rim of the tire and permitting the required relative movement of the outer rim with respect to the inner rim, thus either preventing entirely communication of the shocks to the inner rim or reducing the same to such an extent that they are neutralized and have practically no effect. The leaf springs F—F, by frictional engagement with the friction housings G—G, provide snubbing action for the springs E—E during action of the latter, cutting down the number of oscillations and thus reducing materially vibrations imparted to the vehicle. However, the main functions of the leaf springs are to absorb road shocks and shocks and vibrations due to driving torque imparted to the tire, the leaf springs flexing to accomplish this result.

Referring next to the embodiment of the invention illustrated in Figures 5 to 8 inclusive, 40 indicates the disc portion of a well-known type of demountable wheel of an automobile, which has bolt receiving openings 41 therethrough to accommodate the usual securing bolts for fastening the disc portion to the wheel hub of the vehicle.

Our improved tire structure, as disclosed in Figures 5, 6, 7, and 8, comprises broadly an inner ring J of channel-shaped transverse cross section fixed to the disc of the wheel; an annular series of hard wood segments or blocks K—K seated in the channel of the ring J and fixed to said ring; a second annular series of hard wood segments or blocks L—L surrounding the series K—K and spaced therefrom; flat ringlike side plates M—M at opposite sides of the outer series of blocks, secured to the latter and telescoped over the sides of the channel ring J; laterally spaced annular bands N—N interiorly of the ring composed of the annular series of blocks L—L and to which these blocks are securely anchored; a pair of retaining rings P—P seated in grooves at the lateral outer sides of the blocks of the series L—L; shock absorbing coil springs R—R interposed between the inner and outer annular series of blocks; radially disposed leaf springs S—S having opposite ends extending respectively between adjacent inner blocks and adjacent outer blocks; friction housings T—T between and anchored to adjacent blocks of the outer series and slidingly receiving the outer ends of the leaf springs S—S; and retaining housings V—V between and anchored to adjacent blocks of the inner series.

The inner ring J comprises an annular main body portion 42 provided with outstanding, laterally spaced, circular flanges 43—43 at opposite sides thereof, the ring structure thus being of substantially channel-shaped transverse cross section. The main body portion 42 is of the cross section shown most clearly in Figures 7 and 8 and corresponds to the cross section shape of a well known type of rim commonly employed on automobile wheels. The flanges 43—43 may be formed in one piece with the main body portion 42, but, as herein illustrated are formed of separate pieces, welded to the portion 42 adjacent the outer edges thereof. The ring J is fixed to the disc 40 of the wheel by rivets 44—44 through the body portion 42 of the ring J and an annular peripheral flange 45 of the disc 40.

The blocks or segments K are similar to the blocks B hereinbefore described, but differ therefrom in transverse cross section to fit the interior contour of the ring J. These blocks are preferably eight in number and are arranged in annular series. Each block K is secured to the ring J by a pair of circumferentially spaced, transversely disposed bolts 46—46 extending through the block and the flanges 43—43 of the ring or annulus J. In addition, each block K is anchored to the main body portion 42 of the annulus J by a radially disposed bolt 47 extending through the block, the inner wall of the body portion 42 of the annulus J, and the flange 45 of the disc 40. As shown, the block K is countersunk to accommodate the head of the bolt so that the outer surface of the block is free of any projections. At those points of the flange 45 of the disc 40 where the bolts 47 pass through the flange, the latter is laterally extended to provide seats 48—48 for the nuts of these bolts, the lateral extensions being in the form of projecting ears. These ears in the present case are formed by welding arc-shaped pieces to the edge of the flange 45, the arc-shaped pieces being formed by cutting in half ordinary ring washers of the proper size. These ears, together with the adjacent inner surface portion of the flange 45 of the disc 40, form continuous seats for lock washers 49 for the nuts of the bolts 47.

The outer surfaces of the annular series of blocks K—K form, in effect, a continuous annular surface curved on an arc of the same radius as the peripheral edges of the flanges 43—43 of the ring J. At the outer sides the flanges 43—43 of the ring J are covered by hardened wear plates 50—50 of ring shape. These wear plates are clamped to the flanges 43—43 by the transverse bolts 46 which serve to secure the blocks K—K. As shown, the wear plates 50—50 have inturned flanges 51—51 at their inner edges engaging over inwardly facing shoulders 52—52 presented at the corners of the ring J where the flanges 43—43 join the body portion 42.

The blocks or segments L—L are similar to the blocks C—C hereinbefore described, correspond in number to the blocks K—K and are directly opposed thereto. The blocks L—L are arranged in annular series surrounding the blocks K—K and the outer surfaces of the same form the annular tread of the tire. As shown most clearly in Figures 6, 7, and 8, the blocks are rounded off, as indicated by 53—53, at their outer corners to prevent fraying off as wear takes place in traveling over the road.

The annulus of blocks L—L is embraced at opposite sides by the ringlike side plates M—M. These side plates, which are substantially flat, are preferably of steel. The annular bands N—N, which are also preferably of steel, are in transverse alignment, laterally spaced apart, as shown most clearly in Figures 6, 7, and 8, and are located at a point between the outer and inner peripheral edges of the plates M—M, being spaced a lesser distance from the inner edges of said side plates than from the outer edges thereof. The blocks L—L are clamped between the side plates M—M by a series of transverse securing bolts 54—54 which extend through said side plates and the blocks, three bolts being preferably employed for each block.

Figure 6:
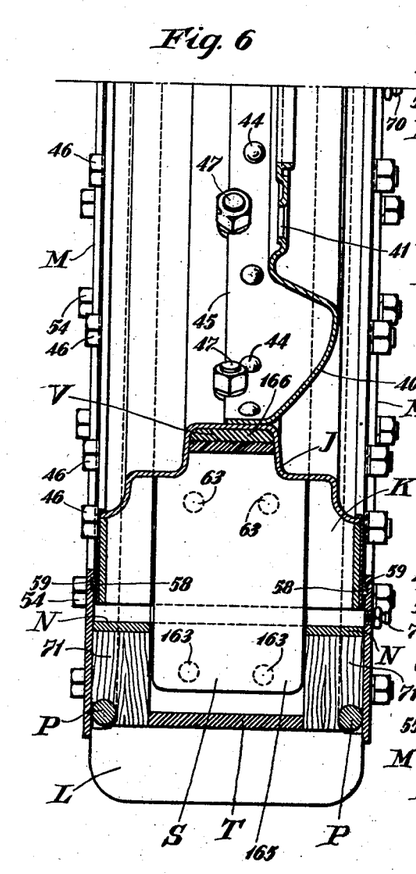
Figure 6 is a transverse, radial, sectional view, corresponding substantially to the line 6—6 of Figure 5.
Figure 7:
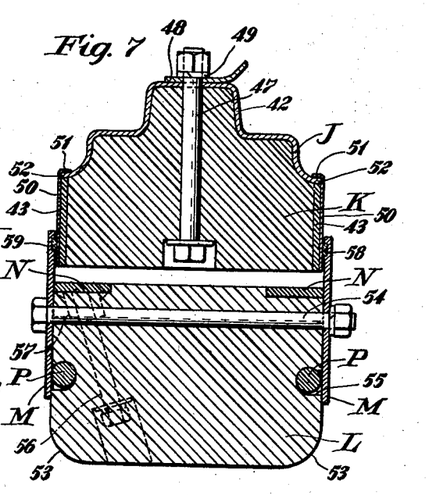
Figures 7 and 8 are transverse, radial, sectional views, corresponding substantially to the lines 7—7 and 8—8 of Figure 5.
Figure 8:
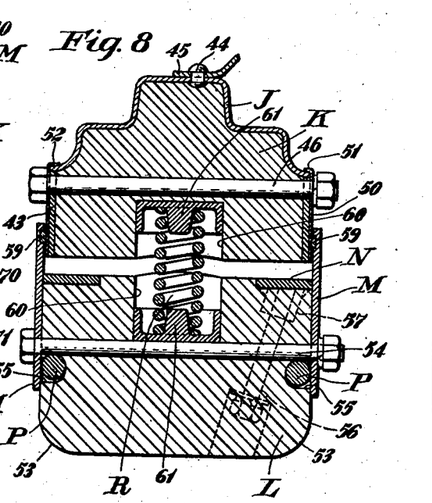

The retaining rings P—P are in the form of bands of round transverse cross section and serve to clamp the blocks L—L of the annular series together, the rings P—P being seated and shrunk into annular grooves or seats 55—55 at opposite sides of the blocks and are held in place by the side plates M—M which overlap these grooves, as shown most clearly in Figures 6, 7, and 8.

The blocks L—L are also anchored and secured to the bands N—N, which are seated in depressions at the opposite sides of the inner surfaces of the blocks, and have their inner surfaces flush with the inner surfaces of these blocks. For anchoring the blocks L—L to the bands, a series of bolts 56—56 are employed, the blocks being countersunk at the tread surface side thereof to accommodate the heads of the bolts, and the bolts extending through the blocks and having their threaded ends screwed into nuts 57—57 in the form of bosses on the bands N—N. Two such bolts are preferably employed for each block, the same being spaced apart a short distance lengthwise of the block, disposed at opposite sides of the longitudinal center thereof, extending inwardly from the tread of the block, and inclined laterally outwardly in opposite direction away from the central radial plane of the annular series of blocks. As shown, these bolts are located at a point near the mid portions of the blocks considered with reference to opposite ends of the same.

As shown in the drawings, the outer edges of the plates M—M are spaced inwardly from the outer peripheral surfaces of the annular series of blocks L—L to preclude injury to the same by contact with protruding portions on the surface of a rough roadway and also allow for a certain amount of wear of the tread portions of the blocks L—L.

At their inner sides the plates M—M overlap the flanges 43—43 of the ring or annulus J, being telescoped over these flanges. At the zone where the plates M—M overlap the flanges 43—43, they are provided with interior annular grooves 58—58 in which rings 59—59 of packing material are seated. The packing rings 59—59 bear on the wear plates 50—50 and serve to hermetically seal the opening between the side plates M—M and the flanges 43—43 of the annulus J.

The blocks K and L are provided with opposed and aligned spring pockets 60—60, each pocket being lined with a cup-shaped cap 61. As shown most clearly in Figure 5, each of the blocks has two such spring pockets.

The coil springs R—R, of which there are sixteen, are interposed between the outer and inner rims of the tire, that is, they are interposed between the blocks of the inner and outer series. The opposite ends of the springs are seated in the cups 61—61 and yieldingly oppose relative approach of the inner and outer rim members of the tire. These springs are under initial compression and function in the same manner as the springs E—E hereinbefore described in connection with the embodiment of the invention illustrated in Figures 1 to 4 inclusive.

Figure 5:
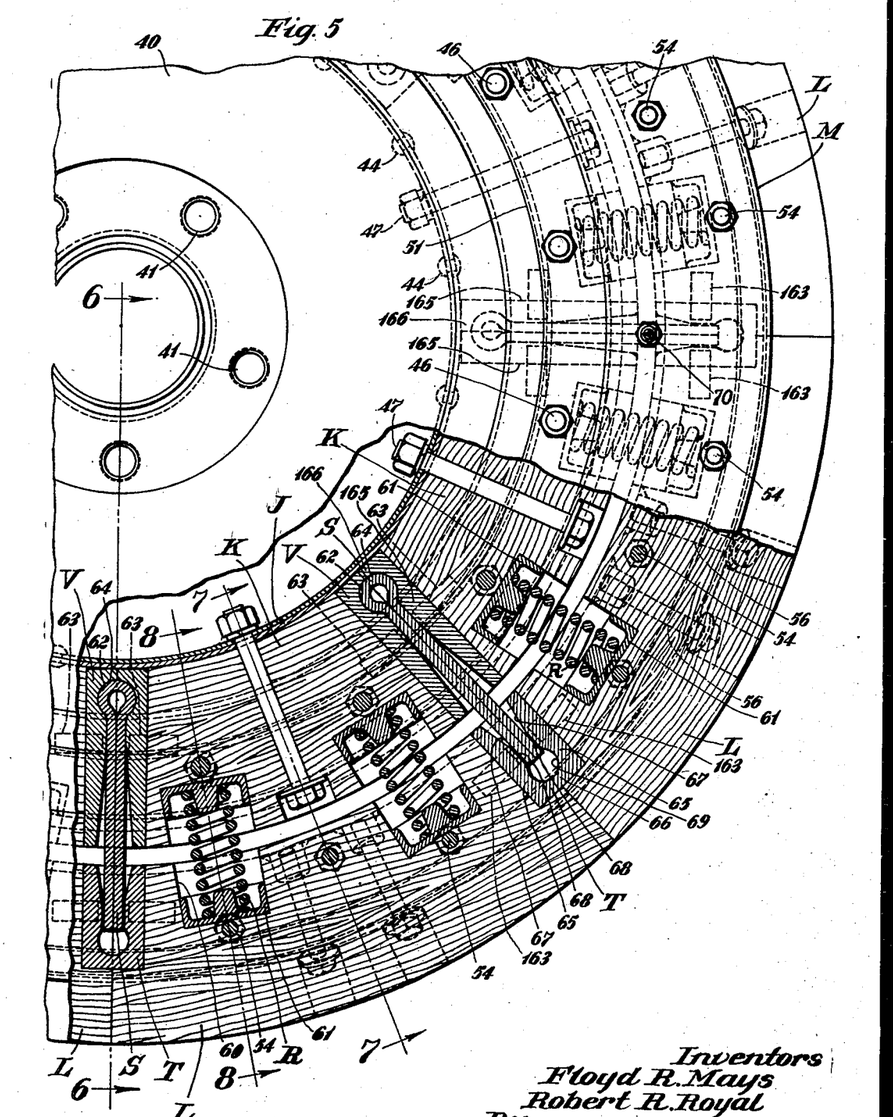
Figure 5 is a part side elevational and part vertical sectional view of a portion of a wheel of an automobile, illustrating another embodiment of our invention.

As shown most clearly in Figure 5, the blocks K—K of the inner series are spaced from each other circumferentially to accommodate the retaining housings V—V therebetween. Each housing V comprises laterally spaced, relatively heavy, side walls 165—165, and a transverse connecting rear end wall 166. As shown, each housing V opens outwardly, the opening thereof being inwardly tapered and terminating in a transverse cylindrical seat or bore 62 at the inner end of the housing. Each housing V is secured to the adjacent blocks K—K by dowel pins 63—63 seated in aligned openings in the blocks and housing side walls. Preferably, two such pins are employed to anchor each housing section.

The leaf springs S—S are in the form of folded flat plates, each spring comprising a single rectangular plate folded upon itself, the bent portion of the plate being ballooned so as to form an enlarged head 64 of tubular form. When the parts are assembled, the head 64 of the folded plate is enclosed within the seat 62 of the housing and the plate is thus securely anchored. The two plate sections of the leaf spring S formed by the folded plate extend through the housing and project outwardly beyond the open end thereof. Eight leaf springs S—S are employed in the complete tire, one for each housing V.

The friction housings T—T, which are also eight in number, are disposed between adjacent blocks L—L of the outer rim of the tire and secured by dowel pins 163—163, the ends of opposed blocks being cut out to provide pockets to accommodate the housings, the side walls of the pockets being formed by separate filler blocks 71—71. Each housing T comprises spaced, relatively heavy side walls 65—65 and a heavy transverse end wall 66 connecting the side walls at the rear or outer end of the housing. The inner or front end of the housing is open and the side walls have flat, inner, opposed surfaces 67—67 which converge rearwardly of the housing. Rearwardly of the surfaces 67—67, the side walls of the housing are provided with laterally spaced, parallel, flat surfaces 68—68 which are shorter than the surfaces 67—67 and form continuations of the latter. Rearwardly of the surfaces 68—68, the side walls of the housing are cut out providing an enlarged recess 69 which is of substantially cylindrical contour and extends transversely of the housing.

The leaf spring S, which is anchored to the housing V, opposed to the corresponding housing T, extends into the latter and has sliding frictional engagement with the interior surfaces 68—68 of the latter. The recess 69 provides clearance for the ends of the plates of the leaf spring S as the same moves inwardly or rearwardly of the housing T. By the tapered formation of the housings T and V, the necessary clearance is provided to accommodate the required bowing or bending of the leaf springs S—S as they yieldingly oppose relative approach of the inner and outer rims of the tire and relative rotation of the same in service.

The coil springs R—R and the leaf springs S—S operate and function similarly to the corresponding coil springs E—E and leaf springs F—F of the embodiment of the invention illustrated in Figures 1 to 4 inclusive, and therefore need no further description.

The leaf springs S—S are properly lubricated by means similar to that shown in Figures 1 to 4 inclusive, the outer side plate M of the tire being provided with fittings 70—70 similar to the fittings 39—39 described in connection with the embodiment of the invention shown in Figures 1 to 4 inclusive to which a discharge tube or nozzle of a greasing device may be connected. In the present instance four such fittings are used, one for every other leaf spring S.

The outer diameter of the tire shown in Figures 5 to 8 inclusive is made sufficiently great so that when the tread surface of the hard wood blocks L—L of the outer series becomes worn a band or wear tire preferably of steel may be placed thereover by shrinking the same in place, and such a use of an outer rim of steel is contemplated. As will be obvious, the use of such an outer band or tread of steel will prolong the life of the tire by taking the road wear and protecting the outer wood blocks of the tire.

From the preceding description taken in connection with the drawings, it will be evident that we have provided an exceedingly efficient tire which effectively absorbs the shocks encountered in traveling on roadways, as well as shocks resulting from driving torque, and that our improved tire entirely eliminates the necessity of employing rubber tires as cushioning means for the wheels of automotive vehicles.

We have herein shown and described what we now consider the preferred manner of carrying out our invention, but the same is merely illustrative and we contemplate all changes and modifications that come within the scope of the claims appended hereto.

We claim:

1. In a tire for vehicle wheels, the combination with an inner annular rim; of an outer annular rim surrounding said inner rim in spaced relation, said inner and outer rims having a plurality of circumferentially spaced, opposed spring seats; coil springs interposed between said rims and having their opposite ends seated in said spring seats; a plurality of radially disposed sets of spring plates, each set of plates having one set of ends thereof imbedded in and anchored to one of said rims; and friction housings secured to and seated in the other of said rims, said housings slidingly receiving the opposite set of ends of said spring plates in sliding frictional contact therewith.

2. In a tire for vehicle wheels, the combination with an outer annular band of metal forming the tread of the tire; of an annulus of hard wood mounted interiorly of said band and secured thereto; an inner ring of metal; an annulus of hard wood mounted exteriorly on said ring and secured thereto, said last named annulus of hard wood being surrounded by said first named annulus of hard wood in spaced relation; radially disposed coil springs interposed between said first and second named annuluses of hard wood to yieldingly resist relative approach of the same; radially disposed sets of leaf springs having one set of ends thereof imbedded in and secured to one of said annuluses; and a plurality of friction housings seated in and fixed to the other of said annuluses and within which the opposite set of ends of the leaf springs has sliding frictional engagement.

3. In a tire for vehicle wheels, the combination with outer and inner rims, said inner rim comprising a metal ring of outwardly opening, channel-shaped cross section, and an annulus of hard wood seated in the channel of said ring, said outer rim comprising an annular metal band forming the tread of the tire and an annulus of hard wood mounted interiorly of said band and secured thereto, said annulus of the outer ring surrounding the annulus of the inner rim in spaced relation; of a plurality of radially disposed coil springs interposed between said inner and outer rims and bearing at opposite ends respectively on the wooden annuluses of said rims to yieldingly resist relative approach of said rims; radially disposed, circumferentially spaced sets of leaf springs having their outer ends imbedded in and secured to said hard wood annulus of the outer rim; a plurality of circumferentially spaced friction housings fixed to said hard wood annulus of the inner rim and slidably receiving the inner ends of the leaf springs in frictional contact with the walls of said housings; and cover plates fixed to opposite sides of the hard wood annulus of the outer rim, said cover plates overlapping and telescopically embracing the ring of channel-shaped cross section.

4. In a tire for vehicle wheels, the combination with outer and inner annular metal rings, said inner ring having outwardly directed, laterally spaced, annular flanges, said outer ring having inwardly directed, laterally spaced, annular flanges telescoped over the flanges of the inner ring; of an annulus of hard wood seated in the channel of each ring, the annulus of hard wood of the outer ring surrounding the annulus of hard wood of the inner ring in spaced relation, said annuluses of hard wood having opposed, circumferentially spaced spring seats; radially disposed coil springs having their opposite ends seated in said opposed spring seats; radially disposed, circumferentially spaced, friction housings mounted in and secured to said hard wood annulus of the ring, each of said housings having opposed interior friction surfaces; and radially disposed, circumferentially spaced sets of leaf springs fixed to said hard wood annulus of the outer ring and projecting into said friction housings in sliding frictional engagement with the friction surfaces of said housings.

5. In a tire for vehicle wheels, the combination with inner and outer rims, each of said rims including an annular ring of steel; of two annular series of hard wood segments, one series of segments mounted exteriorly on the inner ring and the other series of segments being mounted interiorly on said outer ring; radially disposed coil springs interposed between said segments of said inner and outer rings, yieldingly resisting relative approach of said inner and outer rims; retaining housings alternated with said segments of one of said rings; friction housings alternated with the segments of the other ring, said friction housings being aligned respectively with said retaining housings; and a set of leaf springs fixed within each retaining housing and projecting into the aligned friction housing, and having sliding frictional contact with the interior walls thereof.

6. In a tire for vehicle wheels, the combination with an inner rim; of an outer rim surrounding said inner rim, said inner and outer rims each including an annulus of hard wood segments arranged end to end, a metal ring backing said segments and secured thereto, and radially disposed housings alternated with said segments, the metal ring on the inner rim being surrounded by the hard wood annulus of the inner rim and the metal ring of the outer rim surrounding the hard wood annulus of the outer rim; radially disposed coil springs interposed between said hard wood annuluses of the inner and outer rims, said springs being buttressed against said annuluses respectively; and a plurality of radially disposed sets of leaf springs, one set of leaf springs being fixed at one end within the housings of said outer rim and having the other end slidingly engaged in the housing of the inner rim, the outer ends of said housings being flared to permit flexing of said leaf springs.

7. In a tire for vehicle wheels, the combination with an inner rim; of an outer rim, said inner and outer rims each including an annulus of hard wood segments arranged end to end, a metal ring backing said segments and secured thereto, and radially disposed housings alternated with said segments, said housings of the outer and inner rims facing each other in radial alignment, radially disposed coil springs interposed between said annuluses, said segments of said annuluses having metal lined spring seats within which the opposite ends of said springs are seated; and a set of leaf springs fixed within each housing of one of said rims and projecting into the corresponding radially aligned housing of the other rim and having sliding frictional engagement with the walls of said last named housing.

8. In a tire for vehicle wheels, the combination with inner and outer annular rims, said inner rim including an annulus of hard wood segments arranged in circular series end to end, and a metal casing embracing said annulus at opposite sides and interiorly thereof, said outer rim including an annulus of hard wood segments arranged in circular series end to end and surrounding said first named annulus in spaced relation thereto, and a ringlike band surrounding said annulus of hard wood segments of the outer rim and forming the tread of the tire; of flat, annular side plates embracing said annulus of the outer rim at opposite sides and telescoping over the sides of the casing of the inner rim; radially arranged sets of leaf springs fixed to said outer rim between adjacent hard wood segments thereof and projecting between the corresponding opposed hard wood segments of the inner rim; opposed friction plates between said last named segments and secured thereto, between which said leaf springs have sliding frictional engagement, one of said side plates of said outer rim being provided with lubricating fittings at the localities of said sets of leaf springs for conveying lubricant to the latter; and coil springs interposed between said first and second named annuluses and bearing at opposite ends thereon to yieldingly resist relative approach thereof.

9. In a tire for vehicle wheels, the combination with an inner rim comprising a ringlike casing of channel-shaped, transverse cross section, the channel thereof opening outwardly, and an annulus of wood segments seated in said channel-shaped casing, the casing being centrally split in a plane parallel to the plane of the tire, the sections of the housing embracing the annulus at opposite sides and being fixed thereto; of an outer rim surrounding said inner rim in spaced relation thereto, said outer rim comprising an annular metal band forming the tread of the tire, and an annulus of hard wood segments mounted interiorly of the band and secured thereto; spring means interposed between said rims yieldingly resisting relative approach of the same; and radially disposed leaf springs having their opposite ends imbedded in said hard wood annuluses of the inner and outer rims, respectively, said leaf springs yieldingly opposing relative rotation of said outer and inner rims.

10. In a tire for vehicle wheels, the combination with an outer annulus of hard wood forming the tread of the tire; of an inner ring of metal; an annulus of hard wood mounted exteriorly on said ring and secured thereto, said last named annulus of hard wood being surrounded by said first named annulus of hard wood in spaced relation; radially disposed coil springs interposed between said first and second named annuluses of hard wood to yieldingly resist relative approach of the same; radially disposed sets of leaf springs having one set of ends thereof imbedded in and secured to one of said annuluses; and a plurality of friction housings seated in and fixed to the other of said annuluses and within which the opposite set of ends of the leaf springs have sliding frictional engagement.

11. In a tire for vehicle wheels, the combination with outer and inner rims, said inner rim comprising a metal ring of outwardly opening, channel-shaped cross section, and an annulus of hard wood seated in the channel of said ring, said outer rim comprising an annulus of hard wood, said annulus of the outer ring surrounding the annulus of the inner rim in spaced relation; of a plurality of radially disposed coil springs interposed between said inner and outer rims and bearing at opposite ends respectively on the wooden annuluses of said rims to yieldingly resist relative approach of said rims; radially disposed, circumferentially spaced sets of leaf springs having their inner ends imbedded in and secured to said hard wood annulus of the inner rim; a plurality of circumferentially spaced friction housings fixed to said hard wood annulus of the outer rim and slidably receiving the outer ends of the leaf springs in frictional contact with the walls of said housings; and cover plates fixed to opposite sides of the hard wood annulus of the outer rim, said cover plates overlapping and telescopically embracing the ring of channel-shaped cross section.

12. In a tire for vehicle wheels, the combination with outer and inner annular metal rings, said inner ring having outwardly directed, laterally spaced, annular flanges, said outer ring having inwardly directed, laterally spaced, annular flanges telescoped over the flanges of the inner ring; of an annulus of hard wood seated in the channel of each ring, the annulus of hard wood of the outer ring surrounding the annulus of hard wood of the inner ring in spaced relation, said annuluses of hard wood having opposed, circumferentially spaced spring seats; radially disposed coil springs having their opposite ends seated in said opposed spring seats; radially disposed, circumferentially spaced, friction housings mounted in and secured to said hard wood annulus of the outer ring, each of said housings having opposed interior friction surfaces; and radially disposed, circumferentially spaced sets of leaf springs fixed to said hard wood annulus of the inner ring and projecting into said friction housings in sliding frictional engagement with the friction surfaces of said housings.

13. In a tire for vehicle wheels, the combination with an inner rim; of an outer rim surrounding said inner rim, said inner and outer rims each including an annulus of hard wood segments arranged end to end, a metal ring backing said segments of the inner rim and secured thereto, and radially disposed housings alternated with said segments of said inner and outer rims, the metal ring on the inner rim being surrounded by the hard wood annulus of the outer rim; radially disposed coil springs interposed between said hard wood annuluses of the inner and outer rims, said springs being buttressed against said annuluses respectively; and a plurality of radially disposed sets of leaf springs, one set of leaf springs being fixed at one end within the housings of said inner rim and having the other end slidingly engaged in the housing of the outer rim, the outer ends of said housings being flared to permit flexing of said leaf springs.

FLOYD R. MAYS.
ROBERT R. ROYAL.